United States Patent

[11] 3,588,624

| | | | |
|---|---|---|---|
| [72] | Inventor | William H. Marvin | |
| | | Winston-Salem, N.C. | |
| [21] | Appl. No. | 876,638 | |
| [22] | Filed | Nov. 10, 1969 | |
| [45] | Patented | June 28, 1971 | |
| [73] | Assignee | Western Electric Company, Incorporated | |
| | | New York, N.Y. | |

[54] DEMAGNETIZING CIRCUIT
2 Claims, 2 Drawing Figs.

[52] U.S. Cl. .................................................. 317/157.5,
317/124
[51] Int. Cl. ............................................... H01f 13/00
[50] Field of Search .......................................... 317/157.5;
315/8; 340/171.1, (Inquired)

[56] References Cited
UNITED STATES PATENTS

| | | | |
|---|---|---|---|
| 3,450,933 | 6/1969 | Hayden et al. ................ | 315/8 |
| 3,349,319 | 10/1967 | Aiken ................ ................ | 307/311X |

Primary Examiner—Lee T. Hix
Attorneys—W. M. Kain, R. P. Miller and B. I. Levine

ABSTRACT: A circuit for producing a decreasing magnetic field to demagnetize a magnetic object or material includes an oscillator in series with a radiant energy controlled resistor and a coil. A pulse generator excites a lamp to decrease the resistance of the radiant energy controlled resistor to produce a magnetic field in the coil. The oscillator is selected to have a frequency to produce a predetermined number of cycles during the inherent decay time of the radiant energy controlled resistor and lamp.

PATENTED JUN 28 1971   3,588,624

INVENTOR
W. H. MARVIN
BY D. W. Marks
ATTORNEY

DEMAGNETIZING CIRCUIT

CROSS REFERENCE TO RELATED APPLICATION

This invention is related to the invention described in an application for patent by F. H. Blitchington, Jr., Ser. No. 876,637 filed on Nov. 10, 1969 and assigned to the Western Electric Company, Inc.

BACKGROUND OF THE INVENTION

1. Field of the Invention

A permanent magnetic object or material in the presence of a magnetic field assumes a permanent remanent magnetic state. In certain applications, such as testing the permeability of a magnetic core, the magnetic object must be demagnetized or degaussed to remove the remanent state of the magnetic object.

2. Description of the Prior Art

Prior art circuits or demagnetizing cores generally utilize motor driven or manual potentiometers or variable transformers to produce a decreasing current through a coil to demagnetize the magnetic object. Such circuits are extremely slow in operation requiring up to several seconds in order to demagnetize the magnetic object.

SUMMARY OF THE INVENTION

It is an object of the present invention to provide a circuit for rapidly demagnetizing magnetic objects or material.

In accordance with this and other objects, the invention contemplates a demagnetizing circuit including an oscillator in series with a radiant energy controlled resistor and a coil. A pulse generator excites a radiant energy emission device in close proximity to the radiant energy controlled resistor to produce a magnetic flux in the coil. The oscillator has a frequency selected to produce a predetermined number of cycles during the inherent decay time of the radiant energy emission device and the radiant energy controlled resistor.

DETAILED DESCRIPTION

Figure 1:
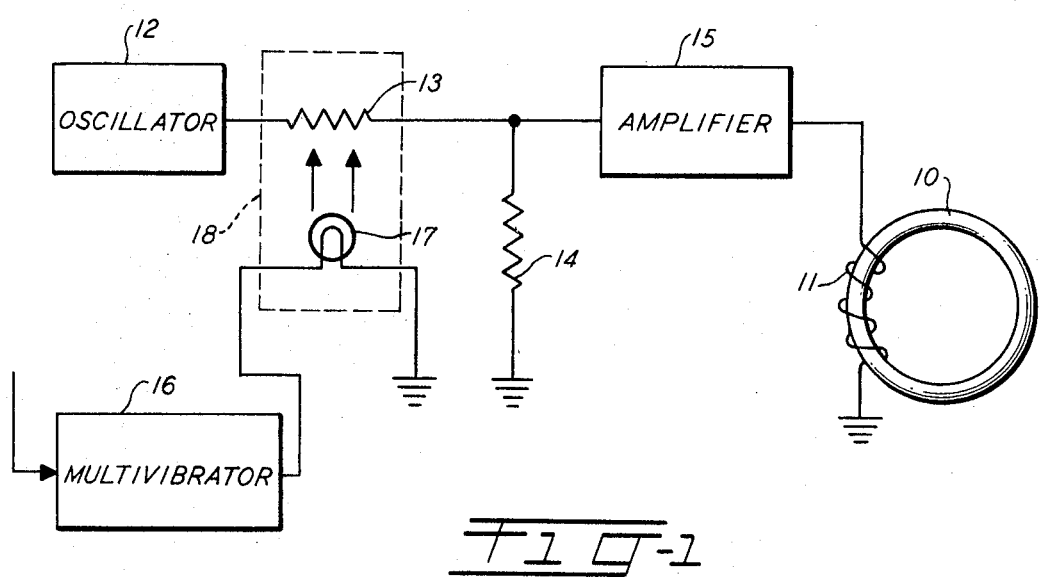
FIG. 1 is a diagram of a circuit embodying the principles of the invention.

Referring to FIG. 1, there is shown a magnetic object 10, such as a ferrite core which is to be demagnetized or degaussed. A coil 11 surrounds the object 10 or is in close proximity to produce a magnetic field in the object 10. The output of an oscillator 12 is applied through a radiant energy controlled resistor 13 such as RAYSISTOR 0CK1122 sold by Raytheon Company of Lexington, Massachusetts, to a load resistance 14. An amplifier 15 amplifier the signal across the resistor 14 and applies it to the coil 11. The output of a pulse generator 16, such as a monostable multivibrator, is applied to an incandescent lamp 17 which is enclosed in a lighttight enclosure 18 with the radiant energy controlled resistor 13.

An input signal to the multivibrator 16 triggers the multivibrator to produce a pulse to illuminate the lamp 17. Light and infrared radiation from the lamp 17 impinges on the radiant energy controlled resistor 13 to greatly reduce the resistance thereof. The amplifier 15 produces a large output signal from the current from the oscillator 12 through the radiant energy controlled resistor 13 and the load resistor 14 to produce a large magnetic field in the coil 11 and object 10.

Figure 2:
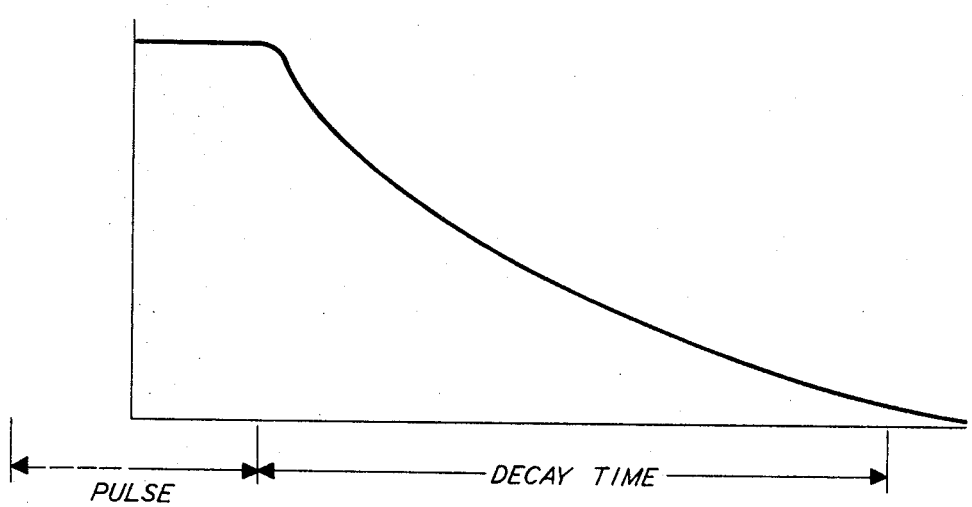
FIG. 2 is a graph illustrating the inherent decay characteristics of a radiant energy controlled resistor and a radiant energy emission device employed in the circuit of FIG. 1.

Referring to FIG. 2, at the end of the pulse produced by the multivibrator 16, the lamp 17 and the radiant energy controlled resistor 13 have an inherent decay time during which the current through the radiant energy controlled resistor 13 reduces from a maximum to a small value insufficient to produce any substantially magnetic field in the object 10. The multivibrator 16 has a fall time which is much more rapid than the decay time of the lamp 17 and the radiant energy controlled resistor 13.

In order to effectively demagnetize the object 10 during the decay time of the magnetic field in the coil 11, a predetermined number of cycles must be applied to the object 10. It has been found that the application of at least 100 cycles of alternating current during the decay time effectively demagnetizes or degausses the magnetic object 10. For example, if the decay time during which the magnetic field in the coil 11 reduces to a negligible value is approximately 100 milliseconds, the oscillator 12 is selected to have a frequency of about 1,000 Hz. to produce 100 cycles during the decay time.

The above-described embodiments are simply illustrative of the principles of the invention. Many other embodiments may be described without departing from the scope and spirit of the invention. For example, the resistor 14, the amplifier 15 may be removed and the radiation sensitive resistor 13 may be replaced by a larger power type radiant energy controlled resistor to operate in an equally suitable manner.

I claim:

1. A rapid magnetic core demagnetizing circuit comprising:
   a coil to which the magnetic core may be placed in close proximity;
   a radiant energy controlled resistance connected in series with the coil;
   a radiant energy emission device in close proximity to the radiant energy controlled resistance;
   a pulse generator for exciting the radiant energy emission device, said pulse generator having a fall time substantially less than the inherent decay times of the radiant energy emission device and the radiant energy controlled resistance; and
   an oscillator connected in series with the radiant energy controlled resistance and the coil, said oscillator having a frequency selected to produce a predetermined number of cycles during the inherent decay time of the radiant energy emission device and radiant energy controlled resistance.

2. A rapid magnetic core demagnetizing circuit as defined in claim 1, wherein the pulse generator includes a multivibrator and the frequency of the oscillator is selected to produce at least 100 cycles during the decay time.